US010460496B1

(12) United States Patent
Jones et al.

(10) Patent No.: US 10,460,496 B1
(45) Date of Patent: Oct. 29, 2019

(54) INFORMATION DISPLAY BY OVERLAY ON AN OBJECT

(71) Applicant: Curious Company, LLC, Portland, OR (US)

(72) Inventors: Anthony Mark Jones, Beaverton, OR (US); Bruce A. Young, Le Mars, IA (US); Jessica A. F. Jones, Forest Grove, OR (US)

(*) Notice: Subject to any disclaimer, the term of this patent is extended or adjusted under 35 U.S.C. 154(b) by 0 days.

(21) Appl. No.: 16/007,204

(22) Filed: Jun. 13, 2018

Related U.S. Application Data

(60) Provisional application No. 62/682,424, filed on Jun. 8, 2018.

(51) Int. Cl.
G06T 11/60 (2006.01)
G06T 11/40 (2006.01)
G02B 27/01 (2006.01)
G06T 19/00 (2011.01)

(52) U.S. Cl.
CPC .......... G06T 11/60 (2013.01); G02B 27/0172 (2013.01); G06T 11/40 (2013.01); G06T 19/006 (2013.01); G02B 2027/014 (2013.01); G02B 2027/0138 (2013.01)

(58) Field of Classification Search
None
See application file for complete search history.

(56) References Cited

U.S. PATENT DOCUMENTS 3,861,350 A 1/1975 Selleck
8,953,841 B1* 2/2015 Leblang .............. G06K 9/00671
345/633
9,852,599 B1 12/2017 Slavin et al.
2002/0191004 A1 12/2002 Ebersole
2002/0196202 A1 12/2002 Bastian et al.
2008/0300854 A1* 12/2008 Eibye ..................... G06K 9/228
704/3
2010/0117828 A1 5/2010 Goldman et al.
(Continued)

FOREIGN PATENT DOCUMENTS

CN 103697900 A 4/2014
CN 105781618 A 7/2016
(Continued)

OTHER PUBLICATIONS

Xiang et al. Object Detection by 3D Aspectlets and Occlusion Reasoning. In the 4th International IEEE Workshop on 3D Representation and Recognition (3dRR), 2013. all pages.*
(Continued)

Primary Examiner — Frank S Chen
(74) Attorney, Agent, or Firm — Young's Patent Services; Bruce A Young

(57) ABSTRACT

A computer system detects an object in a field-of-view (FOV) using at least one sensor coupled to the computer system and determines a shape of the object using a processor of the computer system. An overlay element having the shape and a changeable characteristic is created and a series of values of a parameter over a period of time is obtained. Multiple representations of the overlay element are rendered with the changeable characteristic changed based on the series of values of the parameter and serially presented on a display of the computer system to at least partially occlude the object.

17 Claims, 5 Drawing Sheets

(56) References Cited

U.S. PATENT DOCUMENTS

| | | | |
|---|---|---|---|
| 2013/0222371 | A1 | 8/2013 | Reitan |
| 2013/0249947 | A1 | 9/2013 | Reitan |
| 2013/0249948 | A1 | 9/2013 | Reitan |
| 2017/0091998 | A1 | 3/2017 | Piccolo |
| 2017/0103440 | A1 | 4/2017 | Xing et al. |
| 2017/0192091 | A1* | 7/2017 | Felix .................. G01S 13/42 |
| 2017/0277166 | A1 | 9/2017 | Popa-Simil et al. |
| 2017/0277257 | A1 | 9/2017 | Ota et al. |
| 2017/0301107 | A1* | 10/2017 | Sasaki ............... G06K 9/6218 |
| 2017/0330042 | A1 | 11/2017 | Vaziri |
| 2017/0341576 | A1* | 11/2017 | Lei ..................... B60Q 9/008 |
| 2018/0029641 | A1* | 2/2018 | Solar ................. B62D 15/0275 |
| 2018/0050267 | A1 | 2/2018 | Jones |
| 2018/0053394 | A1 | 2/2018 | Gersten |
| 2018/0239417 | A1* | 8/2018 | Fu ...................... G06F 3/0488 |
| 2018/0261012 | A1* | 9/2018 | Mullins ............. G06T 19/006 |

FOREIGN PATENT DOCUMENTS

| | | |
|---|---|---|
| CN | 107657662 A | 2/2018 |
| WO | 2003060830 A1 | 7/2003 |
| WO | 2017151778 A1 | 9/2017 |

OTHER PUBLICATIONS

Bjerregaard, Lindsay, Consilio3D Technologies Creates New Augmented Reality Inspection Product, Retrieved from http://www.mro-network.com/software/consilio3d-technologies-creates-new-augmented-reality-inspection-product on Jun. 20, 2018.

Daqri, Smart Glasses Specifications Sheet, Retrieved from https://assets.daqri.com/documents/DAQRI_Smart_Glasses_Datasheet_2018.pdf on Jun. 20, 2018.

Daqri, Smart Glasses, Retrieved from https://www.daqri.com/products/smart-glasses/ on Jun. 20, 2018.

Laster Technologies, Laster SeeThru: The First Genuine Augmented Reality Wireless Eyewear Launches on Kickstarter, Retrieved from https://www.businesswire.com/news/home/20140115005387/en/LASTER-SeeThru-Genuine-Augmented-Reality-Wireless-Eyewear on Jun. 20, 2018.

Microsoft, Hololens Overview, Retrieved from https://www.microsoft.com/en-us/hololens/commercial-overview on Jun. 20, 2018.

Microsoft, Why Hololens, Retrieved from https://www.microsoft.com/en-us/hololens/why-hololens on Jun. 20, 2018.

Osterhout Design Group, Smartglasses 7, Retrieved from http://www.osterhoutgroup.com/downloads/pdf/product/R-7HL-TechSheet.pdf on Jun. 20, 2018.

Phillips, Jon, Hands on with Laster SeeThru, a direct augmented-reality challenge to Google Glass, Retrieved from https://www.pcworld.com/article/2105865/hands-on-with-laster-seethru-a-direct-augmented-reality-challenge-to-google-glass.html on Jun. 20, 2018.

Upskill, Comm industrial equipment manufacturing use cases, Retrieved from https://upskill.io/skylight/industries/industrial-equipment/ on Jun. 20, 2018.

Upskill, Getting the Torque Just Right with Skylight Could Save Millions, Retrieved from https://upskill.io/landing/ge-aviation-case-study/ on Jun. 20, 2018.

Occulus, Rift VR Headset, Available on or before Jun. 1, 2018, Retrieved from https://www.oculus.com/rift?utm_campaign=%5bcampaign%5d&utm_source=google&utm_medium=cpc&gclid=Cj0KCQiAzrTUBRCnARIsAL0mqcyb5MhpYgdQ1fI2hb0CxWcIg32N-e8B4Vv-zBcirW136-5JU3PAQaEaAkLaEALw_wcB&gclsrc=aw.ds on Jun. 20, 2018.

Vive, HTC Vive Pro, Available on or before Jun. 1, 2018, Retrieved from https://www.vive.com/us/vive-pro-vr/?gclid=CjwKCAjwIcXXBRBhEiwApfHGTZTvHInsmDrpO7DC7pDJaBzIpsbG7a-U2iWrGgBpoiwc07DoRYThaxoCLVMQAvD_BwE on Jun. 20, 2018.

Epson, Moverio Pro BT-200/BT-300 Smart Headset, Retrieved from https://epson.com/For-Work/Wearables/Smart-Glasses/Moverio-Pro-BT-2000-Smart-Headset-/p/V11H725020 on Jun. 20, 2018.

Farsens, EPC C1G2 Batteryless Ambient Temperature and Barometric Pressure Sensor, Jan. 2018, retrieved from http://www.farsens.com/wp-content/uploads/2018/01/DS-EVAL01-FENIX-VORTEX-RM-V03.pdf on Nov. 30, 2018.

Farsnes, EPC C1G2 Batteryless LED Indicator, Jan. 2018, retrieved from http://www.farsens.com/wp-content/uploads/2018/01/DS-EVAL01-STELLA-R-V03.pdf on Nov. 30, 2018.

Polap, David, et al. "Obstacle Detection as a Safety Alert in Augmented Reality Models by the Use of Deep Learning Techniques." Sensors (Basel) (2017). Retrieved from https://www.ncbi.nlm.nih.gov/pmc/articles/PMC5751448/ on Jun 20, 2018.

Singularity Hub Staff, This Augmented Reality Helmet Helps Firefighters See Through Smoke to Save Lives, Retrieved from https://singularityhub.com/2017/06/28/this-augmented-reality-helmet-helps-firefighters-see-through-smoke-to-save-lives/#sm.00013gl163cseeyjw2l1fob4gx02f on Jun. 20, 2018.

Daqri, Smart Glasses Specifications Sheet, Mar. 15, 2018, Retrieved from https://assets.daqri.com/documents/DAQRI_Smart_Glasses_Datasheet_2018.pdf on Aug. 22, 2019.

\* cited by examiner

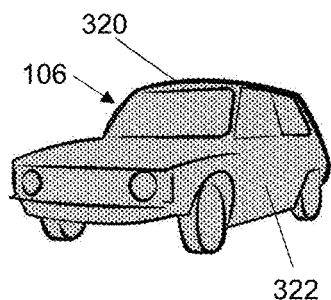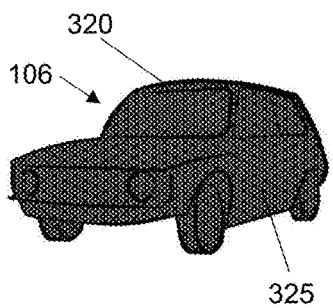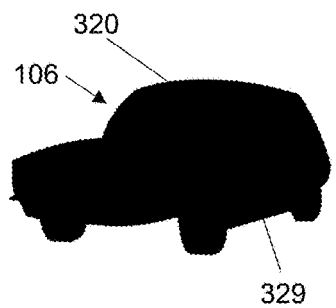
FIG. 3A    FIG. 3B    FIG. 3C
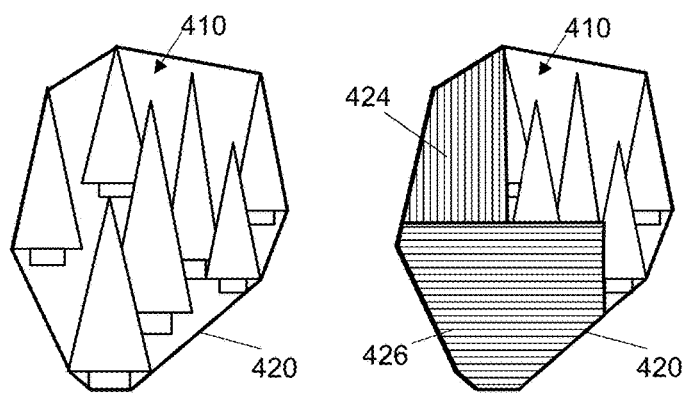
FIG. 4A    FIG. 4B
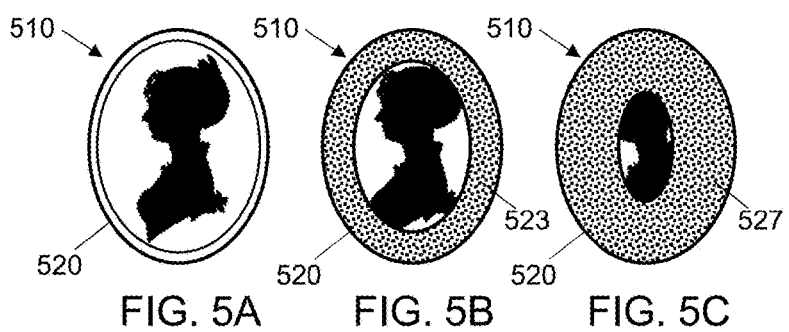
FIG. 5A    FIG. 5B    FIG. 5C

US 10,460,496 B1

INFORMATION DISPLAY BY OVERLAY ON AN OBJECT

CROSS-REFERENCE TO RELATED APPLICATIONS

This application claims the benefit of U.S. Provisional Application 62/682,424, entitled Display Metaphors, filed Jun. 8, 2018, which is hereby incorporated by reference in its entirety herein for any and all purposes.

BACKGROUND

Technical Field

The present subject matter relates to displaying information, and more specifically, to presenting information as an overlay in a display of a scene.

Background Art

Many situations require the presentation information to a user in a way that the user can receive the information when it is needed but is not distracting, confusing or obscures potentially more relevant information. One of many different professions where this is important is for emergency responders where the ability to receive the right information at the right time can be a matter of life or death. Traditionally, emergency responders have relied on audio transmissions over a radio for a majority of their information, but that is changing with the advent of widespread wireless digital communication.

Another new technology that is making its way into the world of emergency responders is digital displays. These displays may be on a handheld device, such as a mobile phone, or on a head-mounted display (HMD), such as a virtual reality (VR) display or an augmented reality (AR) display, which may be integrated into their emergency equipment, such as their helmet. Textual information can be presented to the emergency responder through the display and the information can be updated in real-time through the digital wireless interface from a command center or other information sources.

BRIEF DESCRIPTION OF THE DRAWINGS

The accompanying drawings, which are incorporated in and constitute part of the specification, illustrate various embodiments. Together with the general description, the drawings serve to explain various principles. In the drawings:

FIG. 3A-C show an embodiment of an overlay on an image of a car with different transparency to represent the information;

FIG. 4A-B show an embodiment of an overlay on an image of a group of trees with two different fill areas representing two different parameters;

FIG. 5A-C show an embodiment of an overlay on an image of a portrait with an inside-out fill to represent the information;

DETAILED DESCRIPTION

Figure 1:
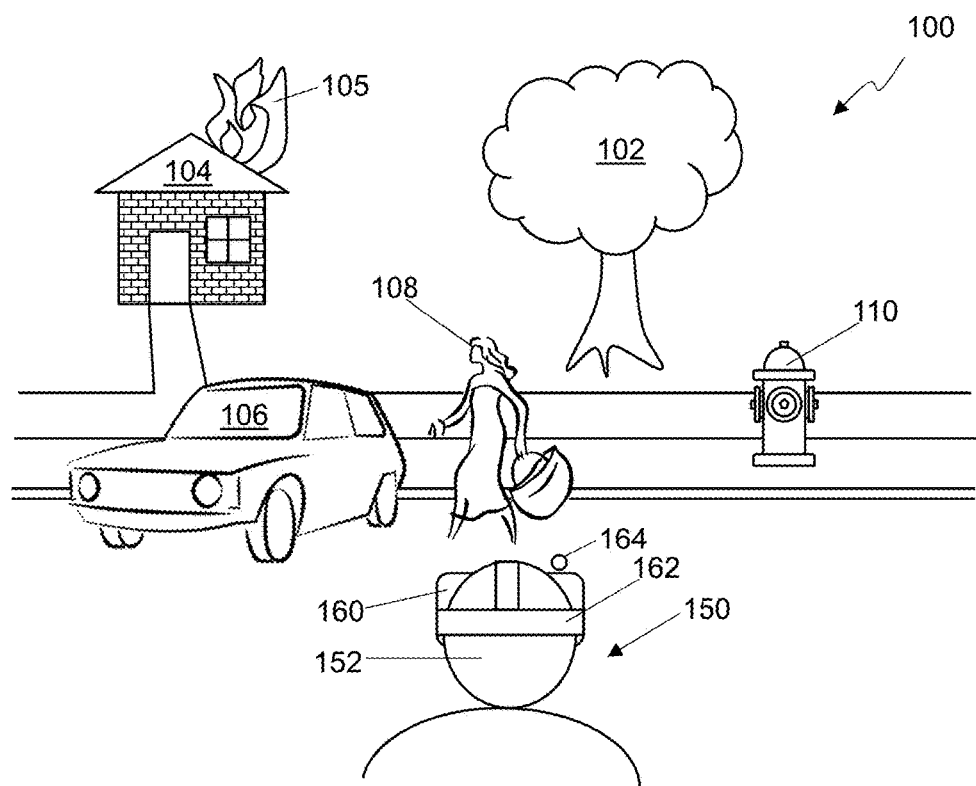
FIG. 1 shows a scene with an emergency responder wearing an embodiment of a head-mounted display.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Hybrid Reality (HR), as the phrase is used herein, refers to an image that merges real-world imagery with imagery created in a computer, which is sometimes called virtual imagery. While an HR image can be a still image, it can also be a moving image, such as imagery created using a video stream. HR can be displayed by a traditional two-dimensional display device, such as a computer monitor, one or more projectors, or a smartphone screen. HR imagery can also be displayed by a head-mounted display (HMD). Many different technologies can be used in an HMD to display HR imagery. A virtual reality (VR) HMD system may receive images of a real-world object, objects, or scene, and composite those images with a virtual object, objects, or scene to create an HR image. An augmented reality (AR) HMD system may present a virtual object, objects, or scene on a transparent screen which then naturally mixes the virtual imagery with a view of a scene in the real-world. A display which mixes live video with virtual objects is sometimes denoted AR, but for the purposes of this disclosure, an AR HMD includes at least a portion of the display area that is transparent to allow at least some of the user's view of the real-world to be directly viewed through the transparent portion of the AR HMD. The display used by an HR system represents a scene which is a visible portion of the whole environment. As used herein, the term "scene" and "field of view" (FOV) are used to indicate what is visible to a user.

The word "occlude" is used herein to mean that a pixel of a virtual element is mixed with an image of another object to change the way the object is perceived by a viewer. In a VR HMD, this can be done through use of a compositing process to mix the two images, a Z-buffer technique to remove elements of the image that are hidden from view, a painter's algorithm to render closer objects later in the rendering process, or any other technique that can replace a pixel of the image of the real-world object with a different pixel value generated from any blend of real-world object pixel value and an HR system determined pixel value. In an AR HMD, the virtual object occludes the real-world object if the virtual object is rendered, transparently or opaquely, in the line of sight of the user as they view the real-world object. In the following description, the terms "occlude", "transparency", "rendering" and "overlay" are used to denote the mixing or blending of new pixel values with existing object pixel values in an HR display.

In some embodiments of HR systems, there are sensors which provide the information used to render the HR imagery. A sensor may be mounted on or near the display, on the viewer's body, or be remote from the user. Remote sensors may include, but are not limited to, fixed sensors attached in an environment, sensors attached to robotic extensions, sensors attached to autonomous or semi-autonomous drones, or sensors attached to other persons. Data from the sensors may be raw or filtered. Data from the sensors may be transmitted wirelessly or using a wired connection.

Sensors used by some embodiments of HR systems include, but are not limited to, a camera that captures images in the visible spectrum, an infrared depth camera, a microphone, a sound locator, a Hall effect sensor, an air-flow meter, a fuel level sensor, an oxygen sensor, an electronic nose, a gas detector, an anemometer, a mass flow sensor, a Geiger counter, a gyroscope, an infrared temperature sensor, a flame detector, a barometer, a pressure sensor, a pyrometer, a time-of-flight camera, radar, or lidar. Sensors in some HR system embodiments that may be attached to the user include, but are not limited to, a biosensor, a biochip, a heartbeat sensor, a pedometer, a skin resistance detector, or skin temperature detector.

The display technology used by an HR system embodiment may include any method of projecting an image to an eye. Conventional technologies include, but are not limited to, cathode ray tube (CRT), liquid crystal display (LCD), light emitting diode (LED), plasma or organic LED (OLED) screens, or projectors based on those technologies or digital micromirror devices (DMD). It is also contemplated that virtual retina displays, such as direct drawing on the eye's retina using a holographic grating, may be used. It is also contemplated that direct machine to brain interfaces may be used in the future.

The display of an HR system may also be an HMD or a separate device, such as, but not limited to, a hand-held mobile phone, a tablet, a fixed monitor or a TV screen.

The connection technology used by an HR system may include any physical link and associated protocols, such as, but not limited to, wires, transmission lines, solder bumps, near-field connections, infra-red connections, or radio frequency (RF) connections such as cellular, satellite or Wi-Fi® (a registered trademark of the Wi-Fi Alliance). Virtual connections, such as software links, may also be used to connect to external networks and/or external compute.

In many HR embodiments, aural stimuli and information may be provided by a sound system. The sound technology may include monaural, binaural, or multi-channel systems. A binaural system may include a headset or another two speaker system, but may also include systems with more than two speakers directed to the ears. The sounds may be presented as 3D audio, where each sound has a perceived position in space, achieved by using reverberation and head-related transfer functions to mimic how sounds change as they move in a particular space.

In many HR system embodiments, objects in the display may move. The movement may be due to the user moving within the environment, for example walking, crouching, turning, or tilting the head. The movement may be due to an object moving, for example a dog running away, a car coming towards the user, or a person entering the FOV. The movement may also be due to an artificial movement, for example the user moving an object on a display or changing the size of the FOV. In one embodiment, the motion may be due to the user deliberately distorting all or part of the FOV, for example adding a virtual fish-eye lens. In the following description, all motion is considered relative; any motion may be resolved to a motion from a single frame of reference, for example the user's viewpoint.

When there is motion in an HR system, the perspective of any generated object overlay may be corrected so that it changes with the shape and position of the associated real-world object. This may be done with any conventional point-of-view transformation based on the angle of the object from the viewer; note that the transformation is not limited to simple linear or rotational functions, with some embodiments using non-Abelian transformations. It is contemplated that motion effects, for example blur or deliberate edge distortion, may also be added to a generated object overlay.

In the some HR embodiments, images from cameras, whether sensitive to one or more of visible, infra-red, or microwave spectra, may be processed before algorithms are executed. Algorithms used after image processing for embodiments disclosed herein may include, but are not limited to, object recognition, motion detection, camera motion and zoom detection, light detection, facial recognition, text recognition, or mapping an unknown environment. The image processing may also use conventional filtering techniques, such as, but not limited to, static, adaptive, linear, non-linear, and Kalman filters. Deep-learning neural networks may be trained in some embodiments to mimic functions which are hard to create algorithmically. Image processing may also be used to prepare the image, for example by reducing noise, restoring the image, edge enhancement, or smoothing.

In some HR embodiments, objects may be detected in the FOV of one or more cameras. Objects may be detected by using conventional algorithms, such as, but not limited to, edge detection, feature detection (for example surface patches, corners and edges), greyscale matching, gradient matching, pose consistency, or database look-up using geometric hashing. Genetic algorithms and trained neural networks using unsupervised learning techniques may also be used in embodiments to detect types of objects, for example people, dogs, or trees.

In embodiments of an HR system, object may be performed on a single frame of a video stream, although techniques using multiple frames are also envisioned. Advanced techniques, such as, but not limited to, Optical Flow, camera motion, and object motion detection may be used between frames to enhance object recognition in each frame.

After object recognition, rendering the object may be done by the HR system embodiment using databases of similar objects, the geometry of the detected object, or how the object is lit, for example specular reflections or bumps.

In some embodiments of an HR system, the locations of objects may be generated from maps and object recognition from sensor data. Mapping data may be generated on the fly using conventional techniques, for example the Simultaneous Location and Mapping (SLAM) algorithm used to estimate locations using Bayesian methods, or extended Kalman filtering which linearizes a non-linear Kalman filter to optimally estimate the mean or covariance of a state (map), or particle filters which use Monte Carlo methods to estimate hidden states (map). The locations of objects may also be determined a priori, using techniques such as, but not limited to, reading blueprints, reading maps, receiving GPS locations, receiving relative positions to a known point (such as a cell tower, access point, or other person) determined using depth sensors, WIFI time-of-flight, or triangulation to at least three other points.

Gyroscope sensors on or near the HMD may be used in some embodiments to determine head position and to generate relative motion vectors which can be used to estimate location.

In embodiments of an HR system, sound data from one or microphones may be processed to detect specific sounds. Sounds that might be identified include, but are not limited to, human voices, glass breaking, human screams, gunshots, explosions, door slams, or a sound pattern a particular machine makes when defective. Gaussian Mixture Models and Hidden Markov Models may be used to generate statistical classifiers that are combined and looked up in a database of sound models. One advantage of using statistical classifiers is that sounds can be detected more consistently in noisy environments.

In some embodiments of an HR system, eye tracking of one or both viewer's eyes may be performed. Eye tracking may be used to measure the point of the viewer's gaze. In an HMD, the position of each eye is known, and so there is a reference frame for determining head-to-eye angles, and so the position and rotation of each eye can be used to estimate the gaze point. Eye position determination may be done using any suitable technique and/or device, including, but not limited to, devices attached to an eye, tracking the eye position using infra-red reflections, for example Purkinje images, or using the electric potential of the eye detected by electrodes placed near the eye which uses the electrical field generated by an eye independently of whether the eye is closed or not.

Turning now to the current disclosure, systems that display HR imagery are becoming increasingly common and are making their way from entertainment and gaming into industrial and commercial applications. Examples of systems that may find HR imagery useful include aiding a person doing a task, for example repairing machinery, testing a system, or responding to an emergency.

Many of the same environments where HR imagery might be used also provide information to a user. This information may be associated with real objects in the environment or may be related to the overall environment, for example an ambient or average value. In other cases the information to be provided to the user is unrelated to the real environment they are working in. Providing the various types of information to the user in a way that can be readily understood by the user and is not confusing, distracting, or obscuring details that the user needs can be a challenge.

Traditionally, audio and/or textual information has been the primary way to provide information to a user. While those modes of information delivery have advantages in the amount of detail that they can provide and the wide range of information that they can convey, understanding detailed audio or textual information diverts attention and takes concentration away from the task at hand, which can be dangerous.

Using HR technology, information can be presented to a user visually in a non-intrusive and natural way. Many types of information can be translated to a value on a scale, such as a linear scale, and the current value of a parameter on the scale can be indicated by a visual element that is presented to a user. A mercury thermometer is a real-world example of how a parameter, such as temperature, can be presented by showing how much mercury extends into the thermometer. Another real-world example is a hand on a stopwatch which indicates a number of seconds as an angle of the hand on the face of the stopwatch.

While many parameters are measured on a linear scale, other parameters may be measured on a non-linear scale such as a logarithmic scale or a Gaussian deviation from a mean value. As long as it makes sense to the user receiving the information, the scale can be any linear or non-linear scale used to represent a value within the range that a parameter may have.

Simply rendering, for example, a thermometer in the display as a virtual element in the HR image, however, may be confusing to a user, as there could be several objects in the image that have a temperature value. A system could place the thermometer near the object being measured or draw a line from the thermometer to the object, but such displays can easily end up looking cluttered, obscure key details, and divert attention from more important items in the display. It would also be possible to superimpose the image of the thermometer on the object but depending on the relative sizes of the object and the detail of the object, that could make it difficult for a user to recognize the object or to see or distinguish other parameter values for the object.

In embodiments, a virtual overlay element is created for an object in the HR image and a characteristic of the overlay element is changed based on a parameter. The overlay element has the same shape as the object. The characteristic may be a fill amount, a transparency, a color, a flicker rate, or any other characteristic that can be varied along the scale for the parameter to indicate the value of the parameter. Once the characteristic of the overlay element has been changed, the overlay element is rendered as an overlay to the real-world object.

In a VR system, where an image of the real-world was used to identify the object, the position of the object in the image is known, so the overlay element can be composited over the top of the image of the real-world object (i.e. overlaid on the image of the real-world object) which occludes at least some of the image of the real-world object. In an AR HMD, the position of the real-world object within the field of view of the user may be determined using sensors, such as those described above herein, mounted on the HMD or elsewhere to locate the real-world object in the user's field of view. Once the location of the object in the field of view has been determined, the virtual overlay element with the change based on the parameter is rendered and displayed in-line with the object in the user's field of view. This occludes at least a portion of the object to the user.

As a non-limiting example, a boiler may be in the view of a firefighter wearing an AR HMD as she enters a mechanical room of a building. One or more sensors on the HMD, such as a visual light camera, an infrared depth camera, or an infrared temperature sensor, capture images of the firefighter's view and a computer coupled to the HMD uses image recognition techniques to identify the boiler and create an overlay element that has the same shape as the image of the boiler. A temperature of the boiler is determined. This can be done using a sensor of the HMD, such as the infrared temperature sensor, or information received by the computer from an external source, such as a control system of the building. It may be known that the boiler has a temperature scale that goes from a minimum expected temperature to a maximum safe operating temperature. The boiler temperature is then determined as a percentage of the range and the overlay element for the boiler is filled with a color based on that percentage. For example, if the minimum expected temperature is 0° C., the maximum safe operating temperature is 120° C., and the current temperature of the boiler is 108° C., the overlay element displays a 90% value. In other embodiments, the overlay element may have it transparency changed from fully transparent at the low end of the temperature range to solid opaque red at the top end of the temperature range. In at least one embodiment, the transparency may shift from transparent to 90% transparent though the normal operating range of the boiler and then shift from 90% transparent to fully opaque as the temperature increases from the maximum normal temperature to the maximum safe operating temperature. In some embodiments, an additional alarm indication may be generated when the value exceeds a threshold. The indication is an addition to the overlay scale such as, but not limited to, blinking, pulsing, or twinkling, to draw the attention of the user without further clutter of the display.

The HR system embodiments disclosed herein allow information to be presented to the user in a way that it can be easily digested without cluttering the screen, confusing the user or distracting the user. A wide variety of different real-world objects may be recognized and tracked, depending on the embodiment, and many different parameter values can be presented to the user. Each parameter may be associated with the real-world object, an ambient condition, or any other information available to the system. Examples of applications of the HR system embodiments disclosed include, but are not limited to, repairing machinery, testing another system, or responding to an emergency.

Reference now is made in detail to the examples illustrated in the accompanying drawings and discussed below.

FIG. 1 shows a scene 100 with an emergency responder 150 wearing an embodiment of a head-mounted display 160. The emergency responder 150 may be responding to a call for help and may just be arriving at the scene 100. The example scene 100, which may also be referred to as the field of view (FOV) of the user 150, includes a tree 102 and a house 104 which is on fire with flames 105 coming from the roof. The scene 100 also includes a bystander 108 rushing to her automobile 106 to flee the scene 100 and a fire hydrant 110.

The emergency responder 150 is wearing a head-mounted display (HMD) 160 which includes straps 162 to hold the HMD 160 on the head 152 of the emergency responder 150. In other embodiments, the HMD 160 may be integrated into a helmet of the emergency responder 150. The HMD 160 may be a virtual reality (VR) HMD or an augmented reality (AR) HMD, depending on the embodiment. The HMD 160 may also include one or more sensors 164, such as, but not limited to, a visual light camera, an infrared camera, a depth camera, radar, lidar, sonar, and/or an ultrasonic depth sensor.

Figure 2:
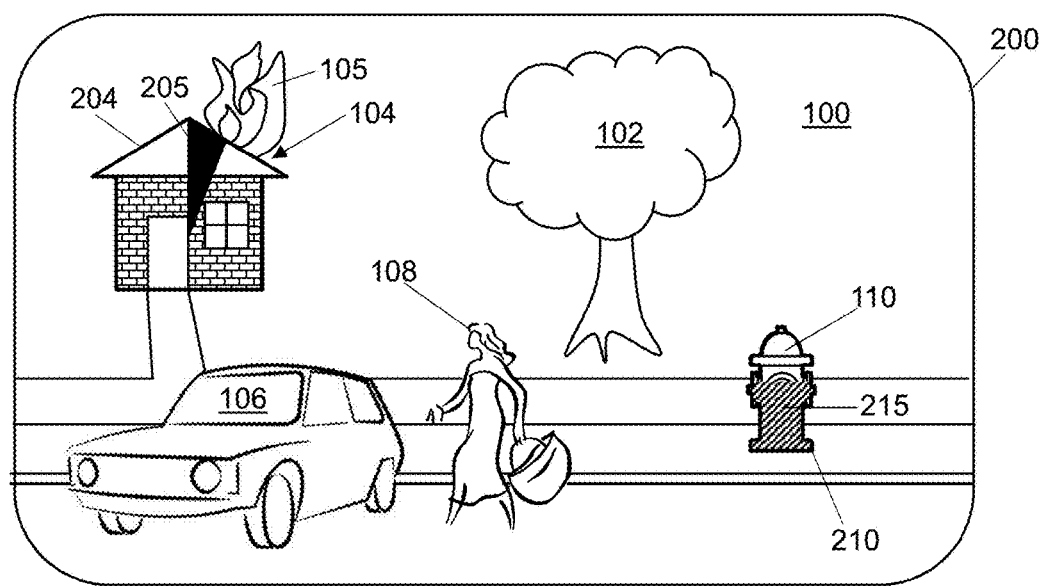
FIG. 2 shows an embodiment of a display showing an image of the scene of FIG. 1 with information overlay.

FIG. 2 shows an embodiment of a display 200 showing an image of the scene 100 of FIG. 1 with information overlay. The display 200 may be a display of the HMD 160 and may be an opaque display of a VR HMD, a transparent display of an AR HMD, or display of a smartphone, or any other type of display. If the display 200 is transparent, the tree 102, the house 104, the flames 105, the automobile 106, the bystander 108 and the fire hydrant 110 may simply be the viewed through the transparent display 200. Thus, in at least some embodiments, the display 200 is a part of a head-mounted display (HMD) and at least a portion of the field of view (or scene 100) is visible to a user through a transparent portion of the HMD. If the display 200 is not transparent, an image of the scene 100 may be captured by a sensor 164, such as a visual light camera, mounted on the HMD 160 and that image projected to show the tree 102, the house 104, the flames 105, the automobile 106, the bystander 108 and the fire hydrant 110. Thus, in some embodiments, images of at least a portion of the field of view (or scene 100) over a period of time are displayed on the display 200.

In embodiments, the HMD system 160 includes a structure 162, adapted to be worn on a head 152 of a user 150, and a display 200 coupled to the structure 162 to position the display 200 in a field-of-view (FOV) of the user 150. A sensor 164 is coupled to the structure 162 which senses at least a portion of the FOV 100 of the user 150. So as a non-limiting example, a depth camera sensor 164 included with the HMD 160 may sense and capture depth information of objects in the FOV 100. The system 160 also includes a processor, coupled to the display 200 and to the sensor 164. The processor may execute code to perform specific functions which can be referred to as configuring the processor to perform those functions.

In embodiments, the processor is configured to determine a shape of an object in a field-of-view (FOV) 100 using data from one or more of the sensors 164. The object may be any real-world object such as the house 104 or the fire hydrant 100 in the FOV 100. The shape of the object may be determined by object recognition. The processor is also configured to create overlay elements 204, 210 having the shape of the objects 104, 110 and changeable characteristics 205, 215 and to obtain a series of values of a parameter over a period of time. The series of values of the parameter may be obtained by any method, but in some embodiments are obtained using the sensor 164 or from an external data source. Depending on the embodiment, the changeable characteristic can include, but is not limited to, a color, a transparency, a fill amount, a numeric tag, a timer hand, or a rate of a pulsating effect.

The parameter may be related to attribute of the object 110. In the example shown, one parameter is the water pressure at the fire hydrant 110, an attribute of the fire hydrant 110 object, which may be obtained from a smart pressure sensor in the fire hydrant 110, but depending on the embodiment, the attribute of the object may include, but is not limited to, a distance from a user to the object, a temperature of the object, a pressure in the object, a hazard level of the object, an expected time remaining to an action by the object, a velocity of the object, or a fuel level of the object. The changeable characteristic 215 of the overlay element 210 having the shape of the fire hydrant 110 is a fill level of the object 210. In FIG. 2, the displayed fill level is about 60% of the object indicating that the water pressure at the fire hydrant is 60% of maximum.

The parameter may be related to attribute of an ambient environment shown in the FOV 100. In the example shown, a time until additional firefighters are expected to arrive is an attribute of an ambient environment, not an attribute directly related to an object in the FOV 100. Other examples of attributes of an ambient environment include, but are not limited to, air temperature, noxious gas concentrations, radiation levels, and noise levels. In the example of FIG. 2, the house 104 is selected to show the ambient parameter by the changeable characteristic 205 of the overlay element 204 having the shape of the house 104. A counterclockwise clearing operation (i.e. a clockwise fill) is used to show the number of minutes within an hour until additional firefighters are expected to arrive, with the changeable characteristic 205 indicating that they should arrive in about 7 minutes.

Note that the overlay elements 204, 210 as positioned on the display, are aligned with their respective objects 104, 110 for a viewer of the display. In some embodiments, the alignment of the overlay element 210 and the object 110 is within 10 pixels of the display 200 and/or an edge of the overlay element 210, as positioned on the display, is within 10 pixels of an edge of the shape of the object 110 for every pixel representing the edge of the overlay element 210. Also, if an AR HMD 160 is used, portions of the objects 104, 110 not occluded by the overlay elements 204, 205, 210 and 215 are visible to the user 150 through the transparent portion of the HMD 160. In some embodiments, the overlay elements 204 and 210 representing an outline of the object are not rendered and are implicitly represented by visible boundaries of the real-world object.

The processor is also configured to render multiple representations of the overlay elements 205, 215 changed based on the series of values of the parameters. In the example shown, the changeable characteristic 205 will have a smaller angle as additional firefighters approach, and fluctuations in water pressure at the fire hydrant 110 will cause the fill level 215 to rise and fall. The processor may also be configured to serially present the multiple representations of the overlay elements 205, 215 over the period of time on the display 200 to at least partially occlude the objects 204, 110 in the FOV 100 of the user 150.

FIG. 3A-C show an embodiment of an overlay 320 on an image of a car 106 with different transparency levels to represent the information. The information could be any type of information related to the car, such as, but not limited to, fuel level, mileage, engine temperature, number of passengers, or weight. Alternatively, the information could be any type of ambient information, such as, but not limited to, air temperature, carbon monoxide level, or a danger level. In at least one embodiment, the transparency level may represent an air pollution level. Further, the information could be a critical value not related to the car 106, such as, but not limited to, the number of people at the scene, time left before evacuation, or a temperature of the viewer.

FIG. 3A shows the car 106 at a first time with the overlay element 320 having about a first transparency level 322 superimposed over the image of the car 106. FIG. 3B shows the car 106 at a second time with the overlay element 320 having about a second transparency level 324 that is less than the first transparency superimposed over the image of the car 106 and FIG. 3C shows the car 106 at a third time with the overlay element 320 having no transparency 324 superimposed over the image of the car 106. The rendering of the transparent overlay element 322 may be done using compositing. The portion of the overlay element that is being seen through may be of a single color or a color that changes with the transparency level, depending on the embodiment. In some embodiments, if the parameter continues to change once the overlay element 329 is opaque (i.e. no transparency), the overlay element 329 may change color, flash, pulse, or have some other visual effect to show that the parameter is changing outside of the normal range. This effect may be used as an alert to danger or to provide information to the user that they should take action. In other embodiments, the edge of the object overlay 320 may change appearance as the parameter value updates.

FIG. 4A-B show an embodiment of an overlay 420 on an image of a group of trees 410 with two different fill areas 424, 426 representing the value of two different parameters. Thus, in some embodiments, the object includes a plurality of items in the field of view. The plurality of items that are grouped together to be a single object based on being proximal to one another in the FOV, having a common attribute, being multiple instances of a single type of item, or any other way of grouping items.

If the object includes a plurality of items, the shape of the object may be determined in several different ways, such as fitting the shape to the exact shape of exterior items with the shortest linking elements possible to link the items, or the shape of the object, and thus the overlay element, may be based on a convex hull 420 covering shapes of the plurality of items 410. A convex hull shape is the shape of the convex polygon with the shortest perimeter that still encompasses all of the items.

FIG. 4A shows the object of a group of trees 410 with a convex hull overlay element 420. In this example, there are two changeable characteristics with the first changeable characteristic being a first fill amount of a first portion of the overlay element 420 and the second changeable characteristic being a second fill amount of a second portion of the overlay element 420. For the example shown in FIG. 4A, both parameters are at their minimum, so neither portion is filled. In other embodiments with two changeable characteristics, the first changeable characteristic and second changeable characteristic each include a color, a transparency, a fill amount, a numeric tag, or a rate of a pulsating effect.

FIG. 4B shows the object of a group of trees 410 with the convex hull shaped overlay element 420 at a different time where the two parameters each are not at a minimum value. The first parameter is associated with a left to right fill of the lower portion 426 of the overlay element 420 and it is about 75% filled indicating that the first parameter is about 75% of the way between its minimum and maximum values. The second parameter is associated with a left to right fill of the upper portion 424 of the overlay element 420 and it is about 30% filled indicating that the second parameter is about 30% of the way between its minimum and maximum values.

FIG. 5A-C show an embodiment of an overlay on an image of a portrait 510 with an inside-out fill to represent the information. FIG. 5A shows the portrait 510 at a first time with an overlay element 520 with a changeable characteristic of an outside in fill, where the parameter is at its minimum value, so there is no fill. In embodiments, the changeable characteristic of the overlay element may include a two-dimensional fill of the overlay element, wherein the fill occurs from the bottom up, from the top down, from the left, from the right, angularly clockwise, angularly counterclockwise, from the outside in, or from the inside out.

FIG. 5B shows the portrait 510 at a second time with the overlay element 520 having its outside in fill characteristic 523 at about 30%. Depending on the scale used, this could represent that the parameter represented by the fill characteristic is at a value that is 1,000 (10 times larger than the minimum value. It should be noted that the portion of the portrait 510 not occluded by the overlay element 520 is still visible to the user.

FIG. 5C shows the portrait 510 at a third time with the overlay element 520 having its outside in fill characteristic 527 at about 70%. Depending on the scale used, this could represent that the parameter represented by the fill characteristic is at a value that is 10,000,000 ($10^7$) times larger than the minimum value.

Figures 6A, 6B, 6C:
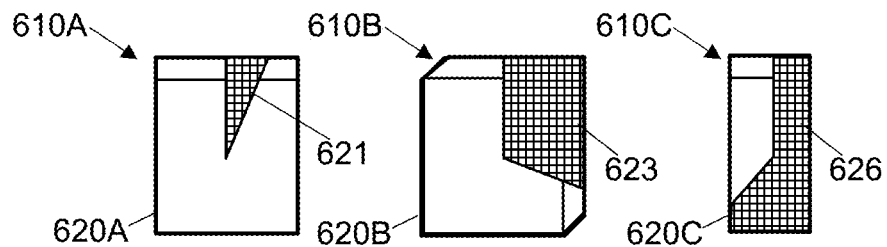
FIG. 6A-C show an embodiment of an overlay on an image of a box from different angles with a clockwise fill to represent the information.

FIG. 6A-C show an embodiment of an overlay 620A-C on an image of a box 610A-C from different angles with a clockwise fill to represent the information. The different angles may be representative of different fields of view where the field of view (FOV) is based on a head position of a user wearing a head mounted display. The head position of the user determines a position of the HMD in space which can determine the origin of the FOV. The apparent motion of any object can be from multiple sources as discussed above.

FIG. 6A shows the box 610A in a first FOV at a first time where the parameter associated with the box 610A is at about 10% of maximum. The center of the first FOV is slightly above center of a first face of the box 610A making a top face of the box 610A visible. Note that from this FOV, the shape of the box 610A, and therefore the shape of the overlay element 620A, is a rectangle with a slightly longer height than width (or more accurately, a hexagon with the two short edges adjacent to the top edge having an angle with their other adjacent side that is close to 180°). The angle of the counterclockwise fill 621 is about 36° to represent the parameter at about 10%.

FIG. 6B shows the box 610B from a second FOV at a second time where the parameter associated with the box is at about one third of maximum. The center of the second FOV has moved to the right of the first FOV so that the second face of the box, orthogonal to the first face, is visible. Note that from this FOV, the shape of the box 610B, and therefore the shape of the overlay element 620B, is a hexagon with two opposite sides much shorter than the others. The angle of the counterclockwise fill 623 is about 120° to represent the parameter at about one third.

FIG. 6C shows the box 610C from a third FOV at a third time where the parameter associated with the box is at about two thirds of maximum. The center of the third FOV is slightly above center of a second face of the box 610C. Note that from this FOV, the shape of the box 610C, and therefore the shape of the overlay element 620C, is a rectangle with a height that is much more than the width (or more accurately a hexagon that closely approximates a rectangle). The angle of the counterclockwise fill 621 is about 240° to represent the parameter at about two thirds.

As can be seen by the example of FIG. 6A-C, the shape of the object may change over the period of time, and the shape of the multiple representations of the overlay element remains consistent with the changes of the shape of the object. The shape of the object may change due to a change in a distance to the object or a change in an orientation of the object in the FOV. The shape of the object may be based on a profile of the object in the FOV.

Figure 7A:
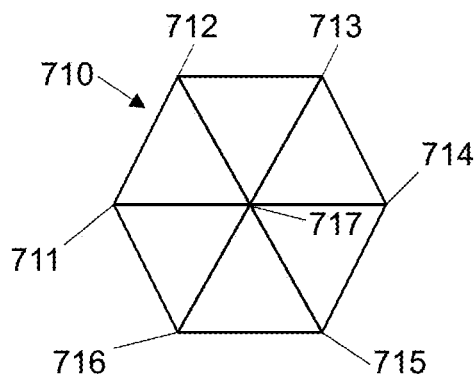
FIG. 7A shows an object with a three-dimensional surface.

FIG. 7A shows an object 710 with a three-dimensional surface. As an illustrative example, the first point 711 is at a distance of 10 units from the user, the second point 712 is at a distance of 9 units from the user, the third point 713 is at a distance of 8 units from the user, the fourth point 714 is at a distance of 7 units from the user, the fifth point 715 is at a distance of 6 units from the user and the sixth point 716 and seventh point 717 are at a distance of 5 units from the user. The object 710 has six visible flat faces defined by the seven points 711-717.

Figures 7B, 7C:
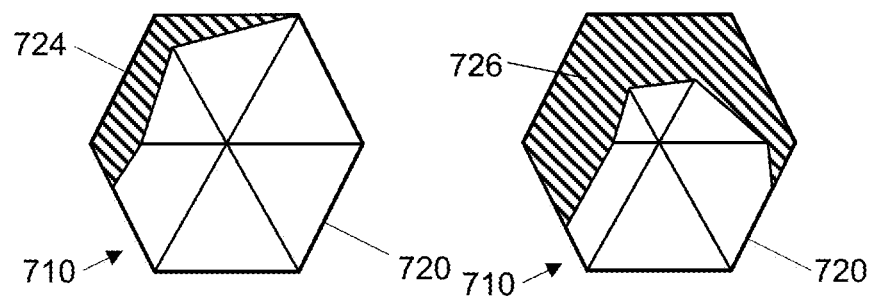
FIG. 7B-C show an embodiment of a three-dimensional fill overlaid on the object of FIG. 7A.

The object 710 may be detected in a FOV by an embodiment and have an overlay element 720 created that has a hexagonal shape. FIG. 7B shows a view of the object 710 at a first point in time where a parameter to be represented by a changeable characteristic of the overlay element 720 has a value of about 40%. The changeable characteristic in this example is a three-dimensional fill of the overlay element, and the fill occurs based on distances to portions of the object. So with the parameter at about 40%, the fill 724 covers portions of the surfaces of the object 710 that are 8 units or more from the user.

FIG. 7C shows a view of the object 710 at a second point in time where a parameter to be represented by a changeable characteristic of the overlay element 720 has a value of about 66%. With the parameter at about 66%, the fill 726 covers portions of the surfaces of the object 710 that are 6.6 units or more from the user.

Figure 8:
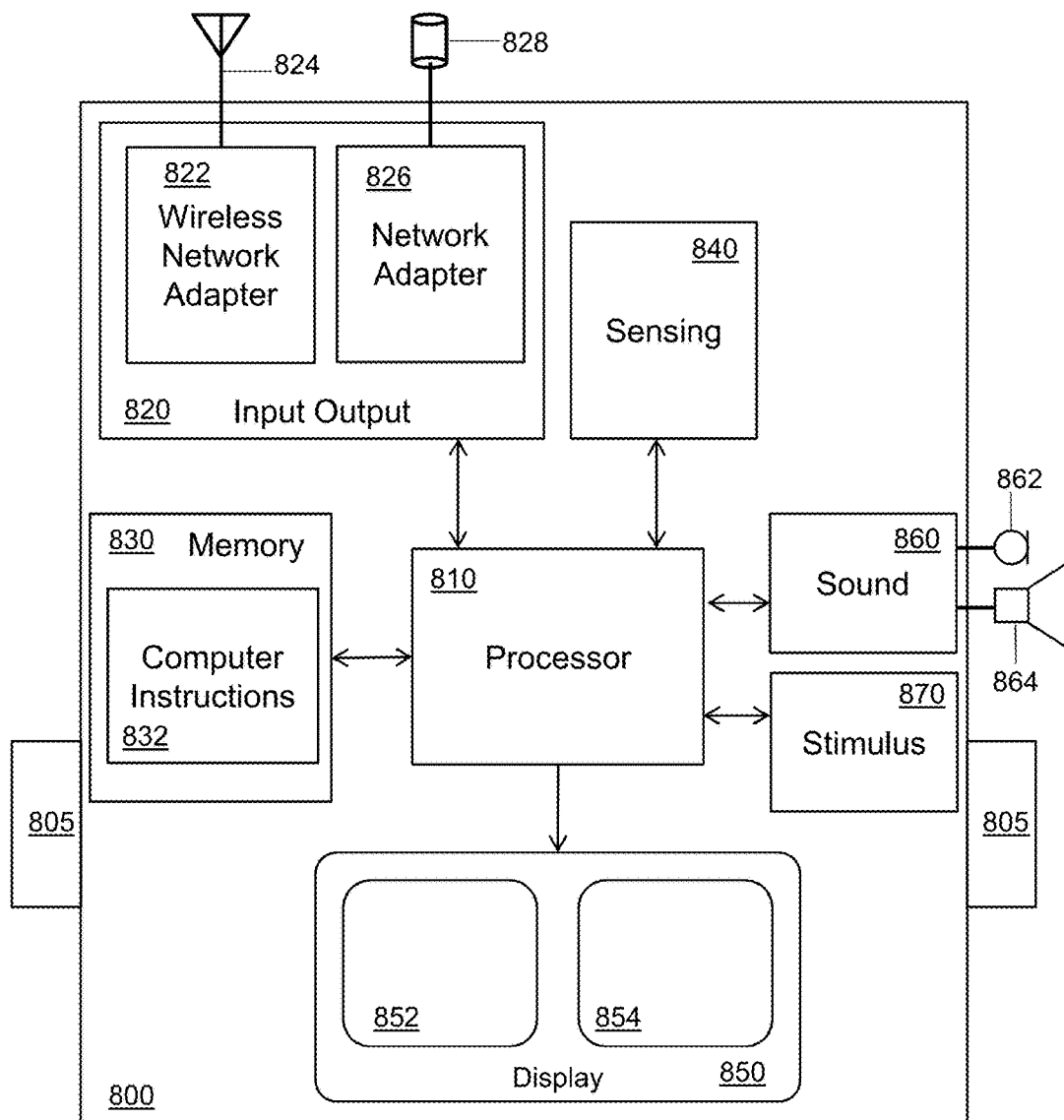
FIG. 8 is a block diagram of an embodiment of a head-mounted display.

FIG. 8 is a block diagram of an embodiment of an HR system 800 which may have some components implemented as part of a head-mounted assembly. The HR system 800 may be considered a computer system that can be adapted to be worn on the head, carried by hand, or otherwise attached to a user. In the HR system 800 shown, a structure 805 is included which is adapted to be worn on the head of a user. The structure 805 may include straps, a helmet, a hat, or any other type of mechanism to hold the HR system on the head of the user as an HMD.

The HR system 800 also includes a display 850 coupled to position the display 850 in a field-of-view (FOV) of the user. In some embodiments, the display 850 may be a stereoscopic display with two separate views of the FOV, such as view 852 for the user's left eye, and view 854 for the user's right eye. The two views 852, 854 may be shown as two images on a single display device or may be shown using separate display devices that are included in the display 850. In some embodiments, the display 850 may be transparent, such as in an augmented reality (AR) HMD. In systems where the display 850 is transparent, the view of the FOV of the real-world as seen through the display 850 by the user is composited with virtual objects that are shown on the display 850. The virtual objects may occlude real objects in the FOV as overlay elements and may themselves be transparent or opaque, depending on the technology used for the display 850 and the rendering of the virtual object. A virtual object, such as an overlay element, may be positioned in a virtual space, that could be two-dimensional or three-dimensional, depending on the embodiment, to be in the same position as an associated real object in real space. Note that if the display 850 is a stereoscopic display, two different views of the overlay element may be rendered and shown in two different relative positions on the two views 852, 854, depending on the disparity as defined by the inter-ocular distance of a viewer.

In some embodiments, the HR system 800 includes one or more sensors in a sensing block 840 to sense at least a portion of the FOV of the user by gathering the appropriate information for that sensor, for example visible light from a visible light camera, from the FOV of the user. Any number of any type of sensor, including sensors described previously herein, may be included in the sensor block 840, depending on the embodiment.

The HR system 800 may also include an I/O block 820 to allow communication with external devices. The I/O block 820 may include one or both of a wireless network adapter 822 coupled to an antenna 824 and a network adapter 826 coupled to a wired connection 828. The wired connection 828 may be plugged into a portable device, for example a mobile phone, or may be a component of an umbilical system such as used in extreme environments.

In some embodiments, the HR system 800 includes a sound processor 860 which takes input from one or microphones 862. In some HR systems 800, the microphones 862 may be attached to the user. External microphones, for example attached to an autonomous drone, may send sound data samples through wireless or wired connections to I/O block 820 instead of, or in addition to, the sound data received from the microphones 862. The sound processor 860 may generate sound data which is transferred to one or more speakers 864. The generated sound data may be analog samples or digital values. If more than one speaker 864 is used, the sound processor may generate or simulate 3D sound placement.

In some embodiments, the HR system 800 includes a stimulus block 870. The stimulus block 870 is used to provide other stimuli to expand the HR system user experience. Embodiments may include numerous haptic pads attached to the user that provide a touch stimulus. Embodiments may also include other stimuli, such as, but not limited to, changing the temperature of a glove, changing the moisture level or breathability of a suit, or adding smells to a breathing system.

The HR system 800 may include a processor 810 and one or more memory devices 830, which may also be referred to as a tangible medium or a computer readable medium. The processor 810 is coupled to the display 850, the sensing block 840, the memory 830, I/O block 820, sound block 860, and stimulus block 870, and is configured to execute the instructions 832 encoded on (i.e. stored in) the memory 830. Thus, the HR system 800 may include an article of manufacture comprising a tangible medium 830, that is not a transitory propagating signal, encoding computer-readable instructions 832 that, when applied to a computer system 800, instruct the computer system 800 to perform one or more methods described herein.

While the processor 810 included in the HR system 800 may be able to perform methods described herein autonomously, in some embodiments, processing facilities outside of that provided by the processor 810 included inside of the HR system 800 may be used to perform one or more elements of methods described herein. In one non-limiting example, the processor 810 may receive information from one or more of the sensors 840 and send that information through the wireless network adapter 822 to an external processor, such as a cloud processing system or an external server. The external processor may then process the sensor information to identify an object in the FOV and send information about the object, such as its shape and location in the FOV, to the processor 810 through the wireless network adapter 822. The processor 810 may then use the geometry, appearance and location of the object in the FOV to render an overlay element and show the overlay element on the display 850.

In some embodiments, the instructions 832 may instruct the HR system 800 to detect an object in a field-of-view (FOV) at a first time using at least one sensor 840 coupled to the computer system 800 and determine a first profile of the object at the first time. The instructions 832 may further instruct the HR system 800 to obtain a first value for a parameter. The first value may be the value of the parameter at the first time, at a time near the first time, or at some other time. The value of the parameter may be obtained from a sensor of the at least one sensor 840 coupled to the computer system 800 or from a source outside of the computer system 800 through a network connection 820.

The instructions 832 may further instruct the HR system 800 to render a first view of an overlay element having the first profile and a first property of a characteristic determined based on the first value. In one non-limiting example, the characteristic is a fill color and the first property is a first color determined based on the first value of the parameter. The first view of the overlay element is then shown on a display 850 coupled to the computer system 800 to at least partially occlude the object.

In embodiments, instructions 832 may further instruct the HR system 800 to detect the object in the field-of-view (FOV) at a second time using the at least one sensor 840 and determine a second profile of the object at the second time. The second profile may be the same as the first profile if the relative position of the object to the user has not changed or the second profile may be different that the first profile is the relative position of the object to the user has changed between the first time and the second time. A second value for the parameter is obtained. The second value may be the value of the parameter at the second time, at a time near the second time, or at some other time.

The instructions 832 may further instruct the HR system 800 to render a second view of the overlay element having the second profile and a second property of the characteristic determined based on the second value and to show the second view of the overlay element on the display 850 to at least partially occlude the object at a time after the showing of the first view of the overlay element. So, to continue the non-limiting example, the second property is a second color determined based on the second value of the parameter; thus, the overly element could be shown in white in the first view and red in the second view based on the parameter changing from a minimum value to a maximum value.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 9:
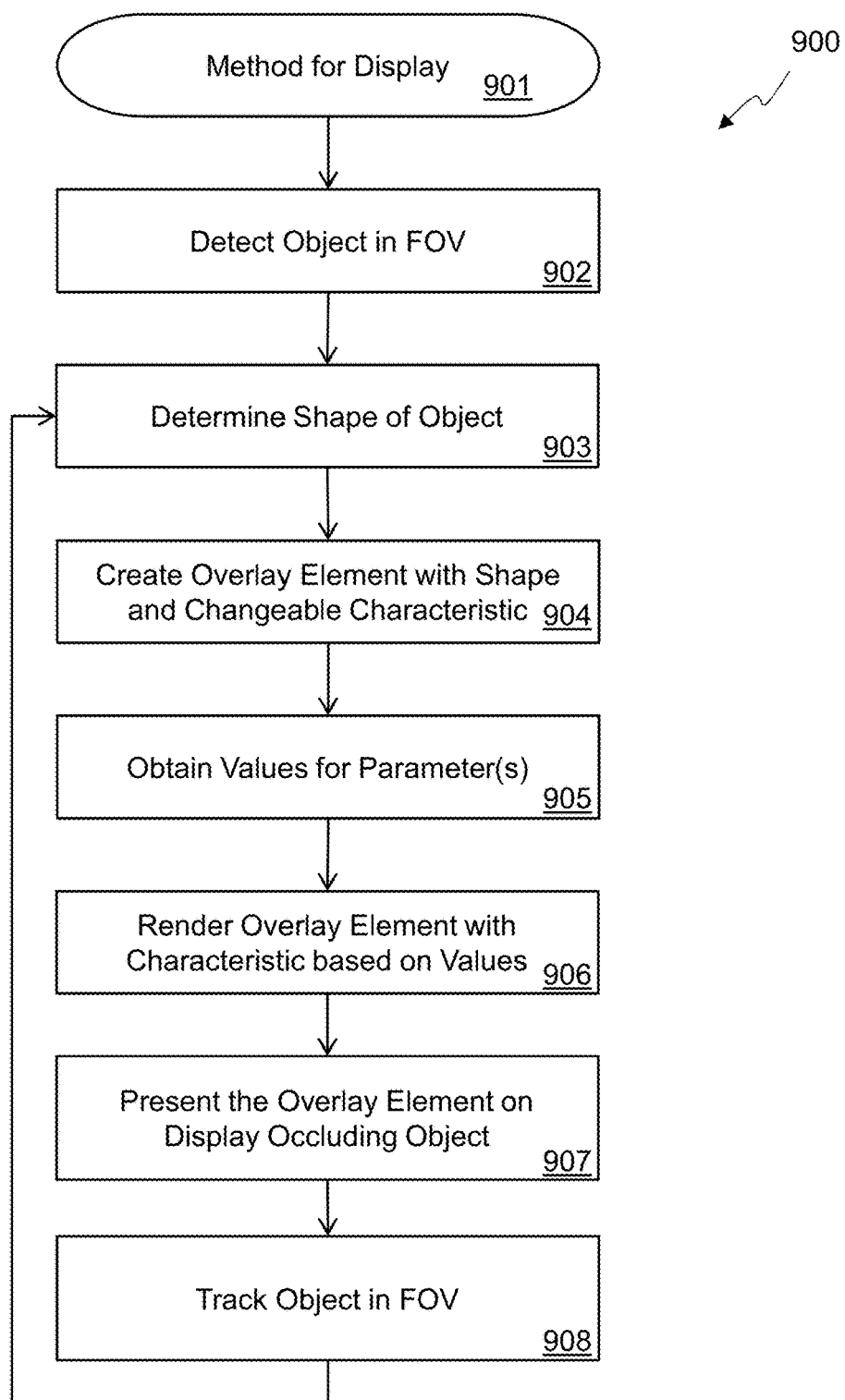
FIG. 9 is a flowchart of an embodiment of a method for display.

FIG. 9 is a flowchart 900 of an embodiment of a method for display. The method starts 901 and includes detecting 902 an object in a field-of-view (FOV) using at least one sensor coupled to the computer system. The method also includes determining 903 a shape of the object using a processor of the computer system. In some embodiments, the processor of the computer system is used by sending information of the sensor to an external processor, such as a cloud-based server, for further processing to determine the shape of the object, but in other embodiments, the processor of the computer system (e.g. a processor located within the HMD) determines the shape of the object itself without using an external processor.

An overlay element is created 904 having the shape and a changeable characteristic and a series of values of a parameter are obtained 905 over a period of time. In some embodiments, values for multiple parameters may be obtained. The parameter(s) may be directly related to the detected object, or may be related to an ambient condition, depending on the embodiment.

The method continues with rendering 906 multiple representations of the overlay element with the changeable characteristic changed based on the series of values of the parameter. Thus, the changeable characteristic, such as a fill amount or a color, of the overlay element changes over time based on the series of values of the parameter. For example, if the parameter goes from a 10% of maximum value at a first time to a 50% of maximum value at a second time, the overlay element may be rendered 10% filled at a time near the first time and be rendered 50% filled at a time near the second time. The portion of the object not occluded by the filled portion of the overlay element may be visible to the user.

In some embodiments, the method includes obtaining a second series of values of a second parameter over the period of time and rendering the multiple representations of the overlay element with a second changeable characteristic based on the second series of values of the second parameters in addition to the first changeable characteristic based on the first series of values of the first parameter. The first changeable characteristic may be different from the second characteristic. Non-limiting examples include the first characteristic being a fill amount and the second characteristic being a color, or the first characteristic being a transparency and the second characteristic being a blink rate.

The multiple representations of the overlay element are then serially presented 907 over the period of time on a display of the computer system to at least partially occlude the object. In some embodiments, the method further includes tracking 908 positions of the object over the period of time in the FOV and using the positions of the object over the period of time to determine positions for the multiple representations of the overlay element on the display over the period of time.

Embodiments may be useful in a variety of applications and in a variety of environments. While use by emergency responders has been described in some detail above, many other fields of endeavor may also use embodiments. Non-limiting examples of environments where embodiments may be used are described below.

One example environment where embodiments may be used is in retail establishments. A retail worker may use an embodiment to show how much inventory is available for various items displayed on a retail shelf. For example, as a worker walks down the toy aisle, the various toys, such as toy airplanes, toy cars, and toy boats, are identified and overlay elements shaped to the individual toys generated. The overlay elements may be filled to various levels to indicate an inventory level, such as an absolute number of the item in the local storeroom, or a number of days of stock given a predicted sales level. In other embodiments, the overlay elements may be split into multiple portions to show stock in multiple locations. In another embodiment, a color or transparency may be used to fill the overlay elements showing the inventory level compared to a target inventory level.

Another example environment where embodiments may be used is manufacturing. Example applications in a manufacturing environment include inventory management and inspection. Similarly to the retail environment, an overlay element shown occluding manufacturing material in a warehouse or on the manufacturing floor may provide information about the amount of the material remaining in stock. For example, the amount of chemical liquid in a large can may be shown as an overlaid gauge, or an expected time to run out of material may be provided as an overlay element. While the amount of material left in the can, bottle or package cannot be identified from outside appearance, a manufacturing system may track the amount of material left in each container and provide that to an HR display to allow a user to easily see how much material remains.

Another example how embodiments may be using in a manufacturing facility is for inspection purposes. In some products, different quality levels of products may be marketed at different prices. For example, a CPU that runs at a higher speed may be marketed as a premium product and so demand a higher price. Embodiments can be used in conjunction with a tester of the product and the quality level, e.g. clock speed, shown as an overlay on the product, making it easy for a technician to identify products having different quality levels and so run further tests that may be required for a premium device, for example extending a life-time test.

In another example of use, a police officer may have an HR display worn on their head, carried on their person, or mounted in the car. As the police officer moves through their environment, different automobiles may be automatically identified from their license plate and information about the car, such as whether or not it is stolen or its tags are up-to-date, may be retrieved from a database and displayed as an overlay element on each identified automobile. Additional information that may be gathered from multiple observations of the car, such as how long it has been parked, may also be displayed as an overlay. Additional information, such as identifying cars to be towed and how long the time has been exceeded may also be shown as an overlay element, making it easy to identify which car is to be towed first.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "server," "circuit," "module,"

"client," "computer," "logic," or "system," or other terms. Furthermore, aspects of the various embodiments may take the form of a computer program product embodied in one or more computer-readable medium(s) having computer program code stored thereon.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object oriented programming languages such as Java, Python, C++, or the like, conventional procedural programming languages, such as the "C" programming language or similar programming languages, or low-level computer languages, such as assembly language or microcode. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a stand-alone software package, partly on the user's computer and partly on a remote computer or entirely on the remote computer or server, such as a cloud-based server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g. 1 to 5 includes 1, 2.78, $\pi$, 3.33, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A method for display in a computer system, the method comprising:
    detecting an object in a field-of-view (FOV) using at least one sensor coupled to the computer system;
    determining a shape of the object using a processor of the computer system;
    creating an overlay element having the shape of the object and a changeable characteristic comprising a transparency or a fill amount;
    obtaining a series of values of a parameter over a period of time, wherein the parameter is related to a temperature of the object, a pressure in the object, a hazard level of the object, an expected time remaining to an action by the object, or a fuel level of the object;
    rendering multiple representations of the overlay element with the changeable characteristic changed based on the series of values of the parameter; and
    serially presenting the multiple representations of the overlay element over the period of time on a display of the computer system to at least partially occlude the object.

2. The method of claim 1, wherein the display of the computer system comprises a head-mounted display (HMD) and at least a portion of the FOV is visible to a user through a transparent portion of the HMD.

3. The method of claim 1, wherein the multiple representations of the overlay element, as positioned on the display, are aligned with the object for a viewer of the display.

4. The method of claim 1, wherein the at least one sensor comprises a visual light camera, an infrared camera, a depth camera, radar, lidar, sonar, or an ultrasonic depth sensor.

5. The method of claim 1, wherein the object comprises a plurality of items in the FOV.

6. The method of claim 5, wherein the shape of the object is a convex polygon with a shortest perimeter encompassing individual shapes of the plurality of items.

7. The method of claim 1, further comprising:
tracking positions of the object over the period of time in the FOV; and
using the positions of the object over the period of time to determine positions for the multiple representations of the overlay element on the display over the period of time.

8. The method of claim 7, wherein the display of the computer system comprises a head-mounted display (HMD) and the FOV is based on a position the HMD.

9. The method of claim 1, wherein the shape of the object changes over the period of time, and the shape of the multiple representations of the overlay element remains consistent with the changes of the shape of the object.

10. The method of claim 9, wherein the shape of the object changes due to a change in a distance to the object or a change in an orientation of the object in the FOV.

11. The method of claim 1, wherein the series of values of the parameter are obtained from a source outside of the computer system through a network connection of the computer system.

12. The method of claim 1, wherein the series of values of the parameter are obtained using a sensor of the at least one sensor coupled to the computer system.

13. The method of claim 1, further comprising:
determining a range of distances to portions of the object; and
filling portions of the overlay element at a given time in the period of time based on both a distance to a corresponding portion of the object as a percentage of the range of distances and a value of the series values of the parameter to create a three-dimensional fill of the overlay element.

14. The method of claim 1, wherein the series of values of the parameter is a first series of values of a first parameter and the changeable characteristic is a first changeable characteristic, the method further comprising:
obtaining a second series of values of a second parameter over the period of time; and
rendering the multiple representations of the overlay element with a second changeable characteristic changed based on the second series of values of the second parameters in addition to the first changeable characteristic changed based on the first series of values of the first parameter;
wherein the first changeable characteristic is different from the second changeable characteristic.

15. The method of claim 14, wherein the first changeable characteristic comprises a transparency and the second changeable characteristic comprises a fill amount.

16. An article of manufacture comprising a tangible medium, that is not a transitory propagating signal, encoding computer-readable instructions that, when applied to a computer system, instruct the computer system to perform a method comprising:
detecting an object in a field-of-view (FOV) at a first time using at least one sensor coupled to the computer system;
determining a first profile of the object at the first time;
obtaining a first value for a parameter, wherein the parameter is related to a temperature of the object, a pressure in the object, a hazard level of the object, an expected time remaining to an action by the object, or a fuel level of the object;
rendering a first view of an overlay element having the first profile and a property of a characteristic determined based on the first value, the characteristic comprising a transparency or a fill amount;
showing the first view of the overlay element on a display coupled to the computer system to at least partially occlude the object;
detecting the object in the field-of-view (FOV) at a second time using the at least one sensor;
determining a second profile of the object at the second time;
obtaining a second value for the parameter;
rendering a second view of the overlay element having the second profile and a second property of the characteristic determined based on the second value; and
showing the second view of the overlay element on the display to at least partially occlude the object at a time after the showing of the first view of the overlay element.

17. A system comprising:
a display;
a structure, coupled to the display and adapted to position the display in a field-of-view (FOV) of the user;
a sensor, coupled to the structure, to sense at least a portion of the FOV of the user;
a processor, coupled to the display and the sensor, and configured to:
determine a shape of an object in a field-of-view (FOV) using data from the sensor;
create an overlay element having the shape of the object and a changeable characteristic, the changeable characteristic comprising a transparency or a fill amount;
obtain a series of values of a parameter over a period of time, wherein the parameter is related to a temperature of the object, a pressure in the object, a hazard level of the object, an expected time remaining to an action by the object, or a fuel level of the object;
render multiple representations of the overlay element with the changeable characteristic changed based on the series of values of the parameter; and
serially presenting the multiple representations of the overlay element over the period of time on the display to at least partially occlude the object in the FOV of the user.

* * * * *